United States Patent [19]
Goodhue

[11] Patent Number: 5,283,944
[45] Date of Patent: Feb. 8, 1994

[54] APPARATUS FOR PLACEMENT OF ANGLE PLATES IN TRANSVERSE DUCT FLANGES

[76] Inventor: William V. Goodhue, 57 Pojac Point, North Kingstown, R.I. 02852

[21] Appl. No.: 21,453

[22] Filed: Feb. 23, 1993

[51] Int. Cl.⁵ .................... B23P 19/00; B23Q 7/10
[52] U.S. Cl. ........................ 29/701; 29/709; 29/818; 29/243.5; 29/252
[58] Field of Search .............. 29/701, 709, 809, 818, 29/238, 243.5, 251, 252, 451, 525; 285/363, 368, 405, 412, 424

[56] References Cited
U.S. PATENT DOCUMENTS

| | | | |
|---|---|---|---|
| 4,332,203 | 6/1982 | Flowers | 29/252 X |
| 4,507,836 | 4/1985 | Hiromitsu | 29/252 |
| 4,870,749 | 10/1989 | Roy et al. | 29/809 X |

*Primary Examiner*—Timothy V. Eley
*Attorney, Agent, or Firm*—Breiner & Breiner

[57] ABSTRACT

An apparatus for and method of installing angle plates at the corners of ducts which has at the opposite ends of each panel of the duct channel shaped flanges into which is installed an angle plate with the angle plates being utilized to secure adjacent ducts together utilizing fasteners. The angle plates are configured so as to be automatically fed by way of a supply hopper and associated machinery is constructed whereby a lowermost angle plate in a stack is automatically fed into position overlying duct channel flanges after the duct has been clamped in place followed by the forcing of the angle plate into the duct channel flanges and the securement of the angle plate in place. There is a notch in each corner of the duct between adjacent channel flanges and the angle plate is initially positioned with a corner portion thereof tilted downwardly into the notch, after which the angle plate is pressed into the two channel flanges. The machine may place two angle flanges into two corners of one end of the duct and, further, there may be two sets of machinery so as to simultaneously place angle plates into the channel flanges at both the bottom and top of a duct. Finally, the duct may come with two portions joined by a seam which is automatically locked together at the time of the placement of the angle plates.

17 Claims, 6 Drawing Sheets

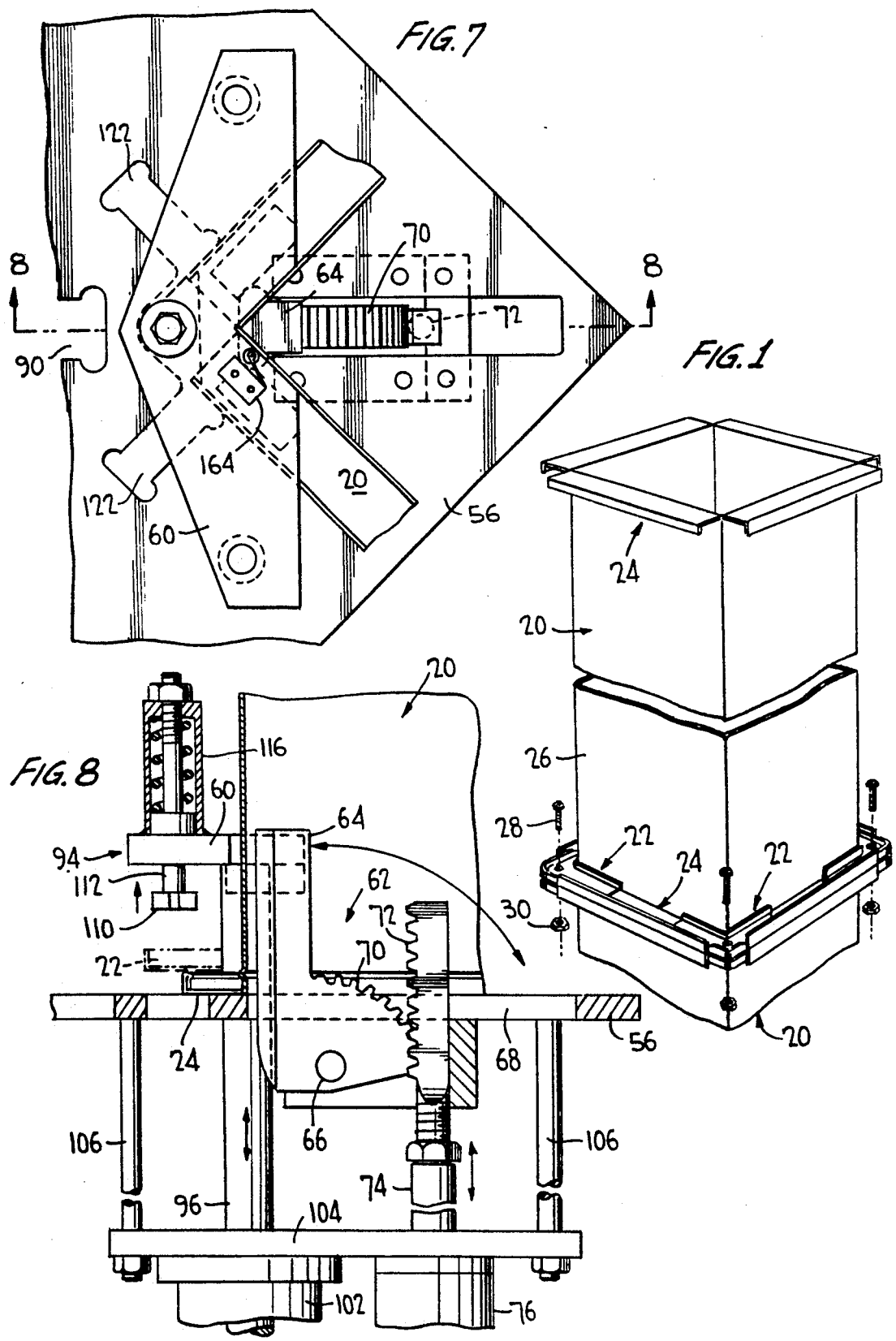

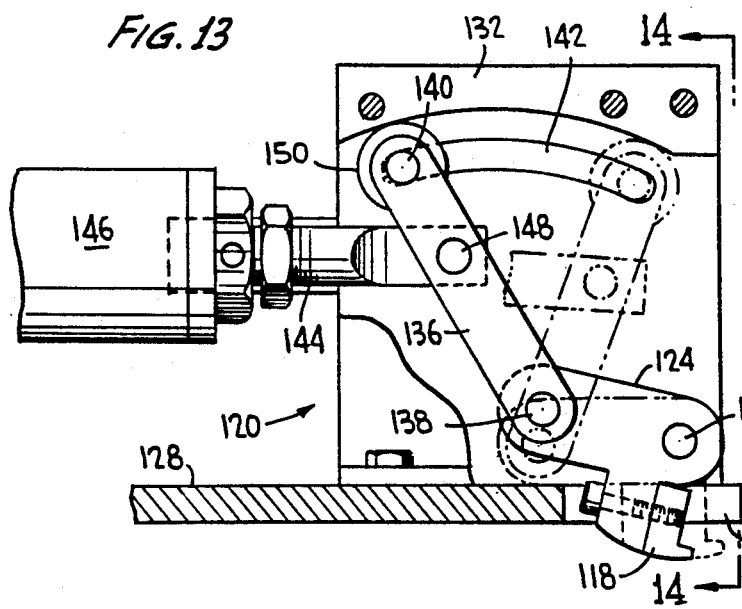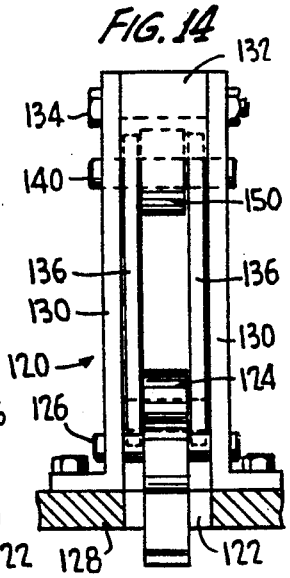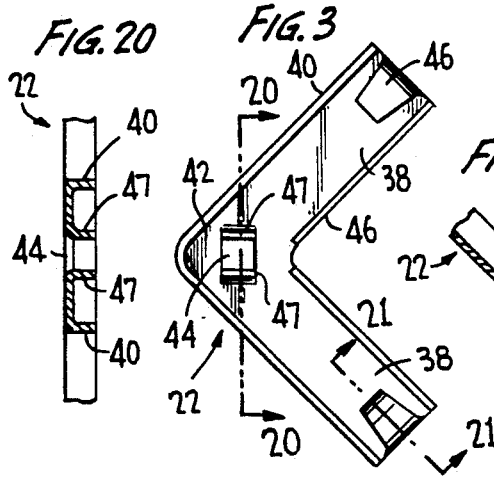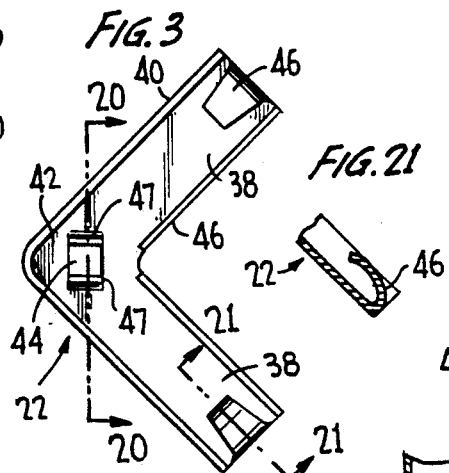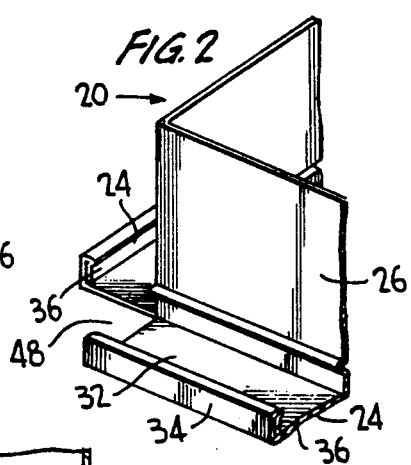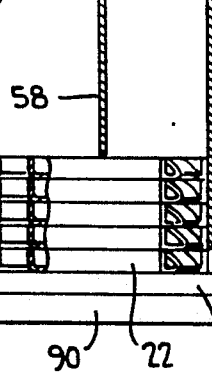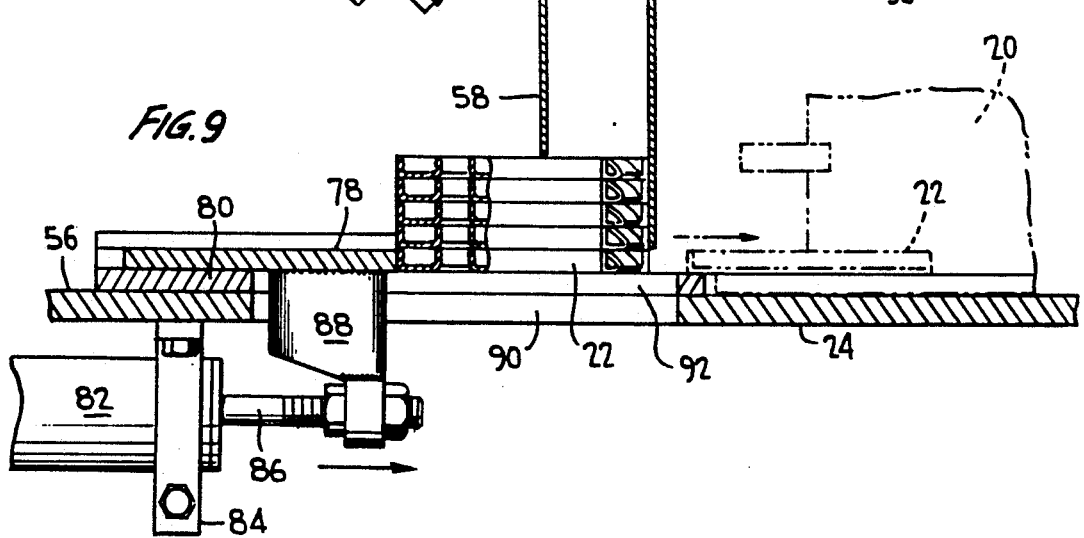

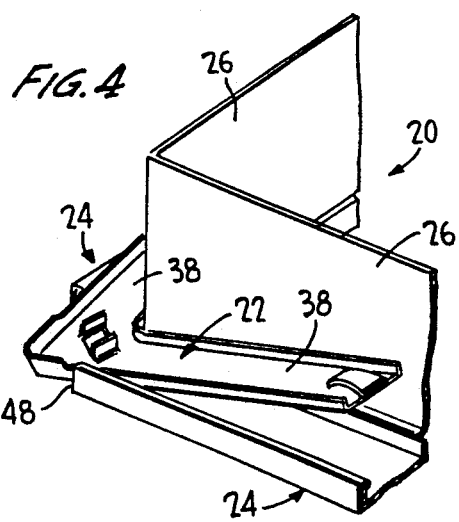
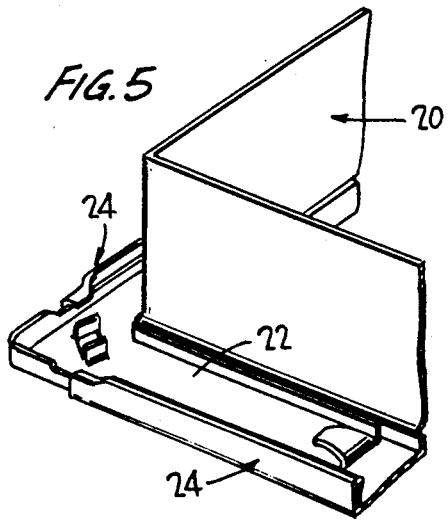
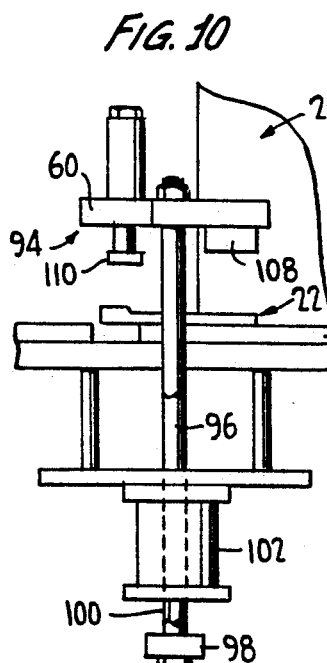
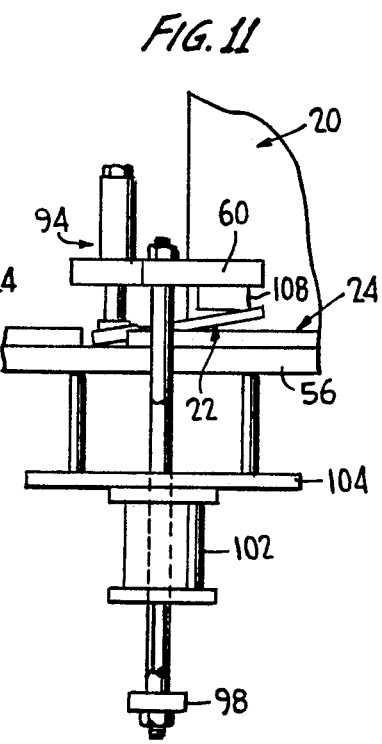
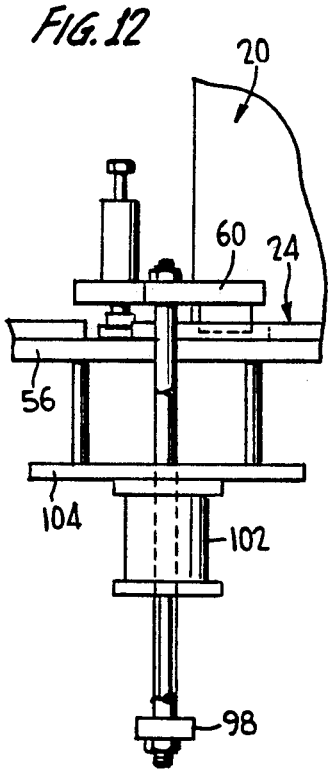

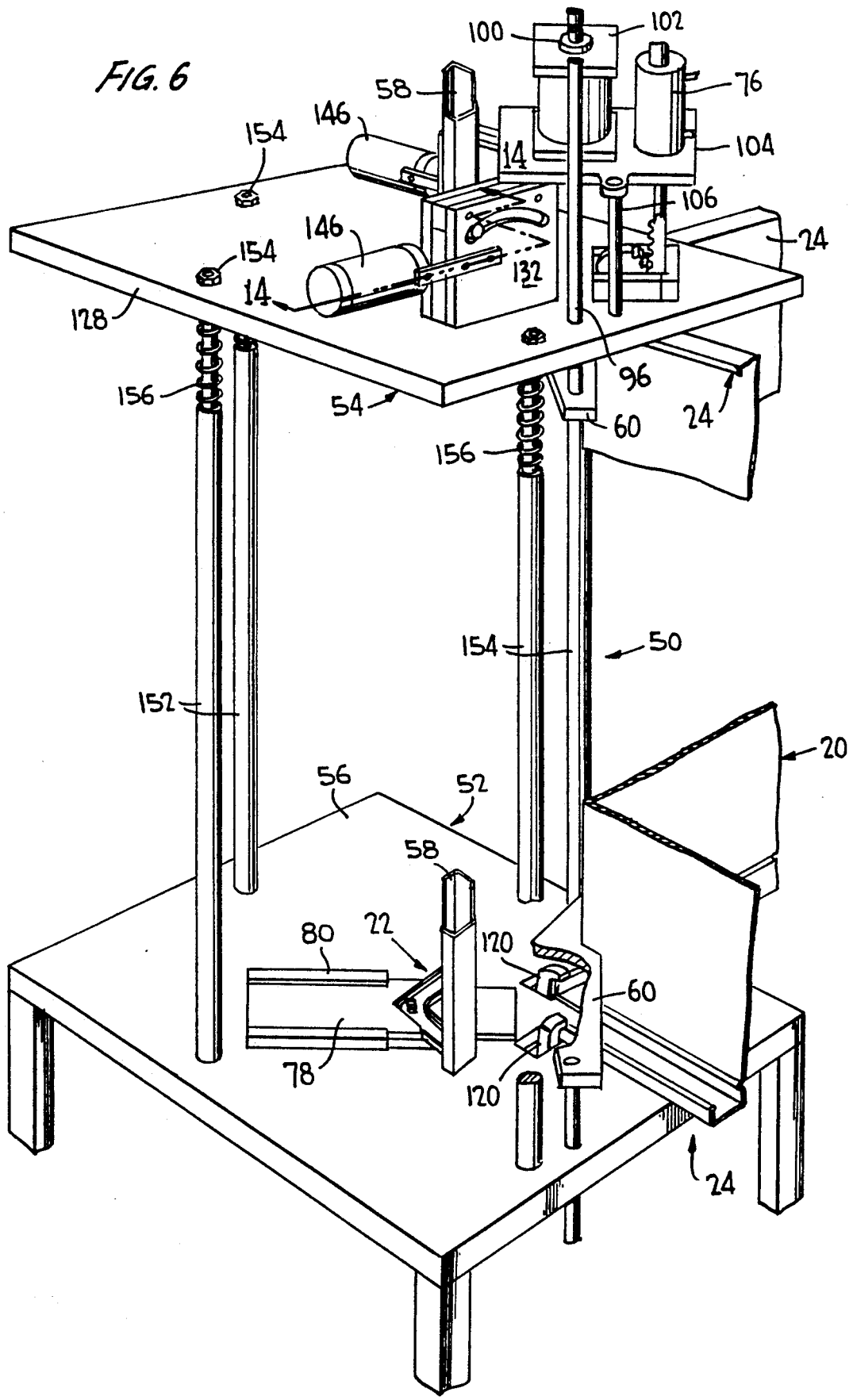

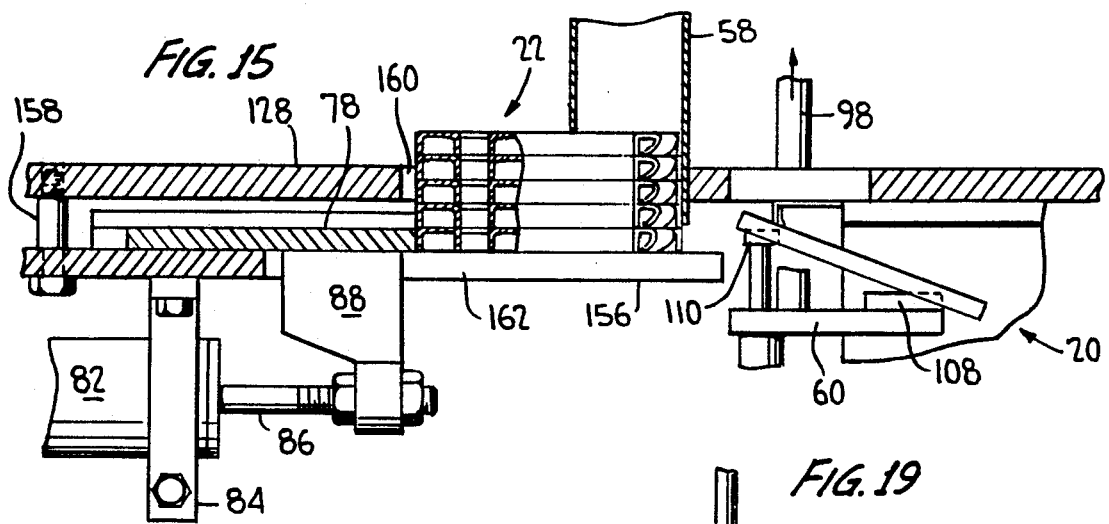
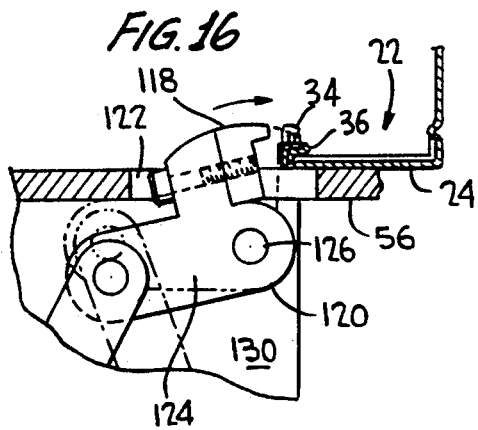
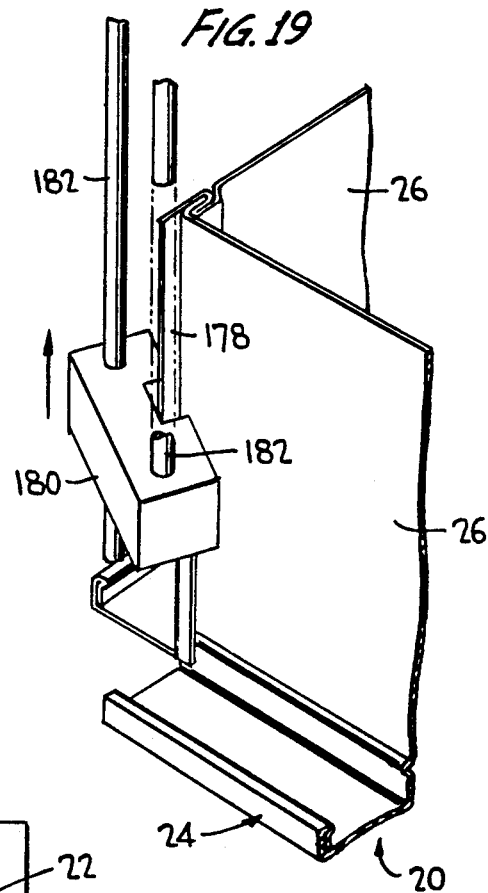
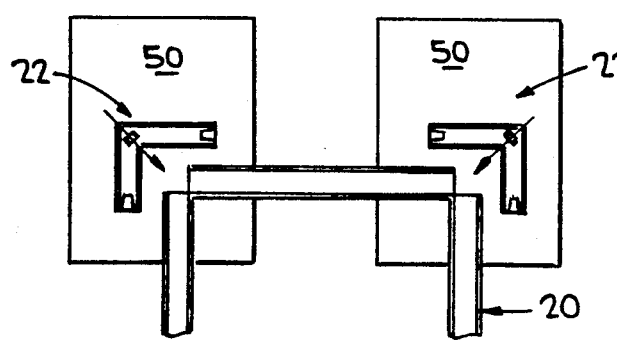

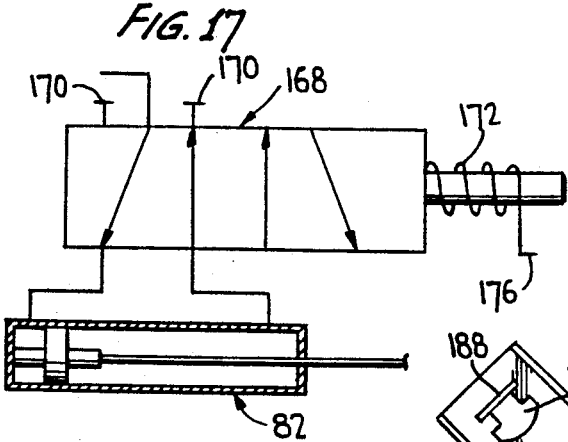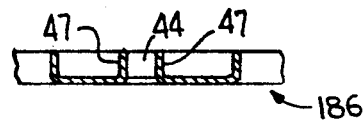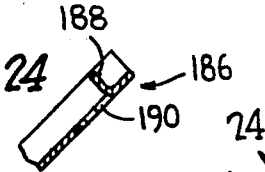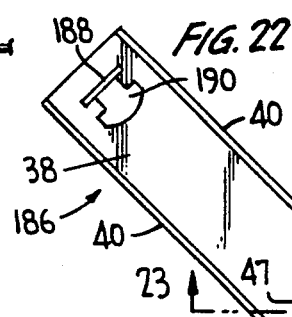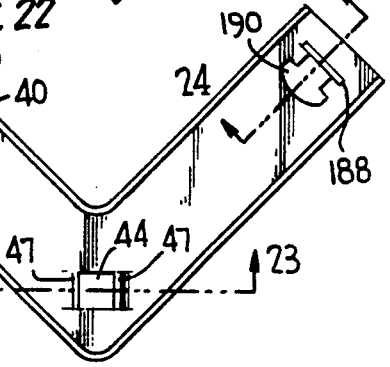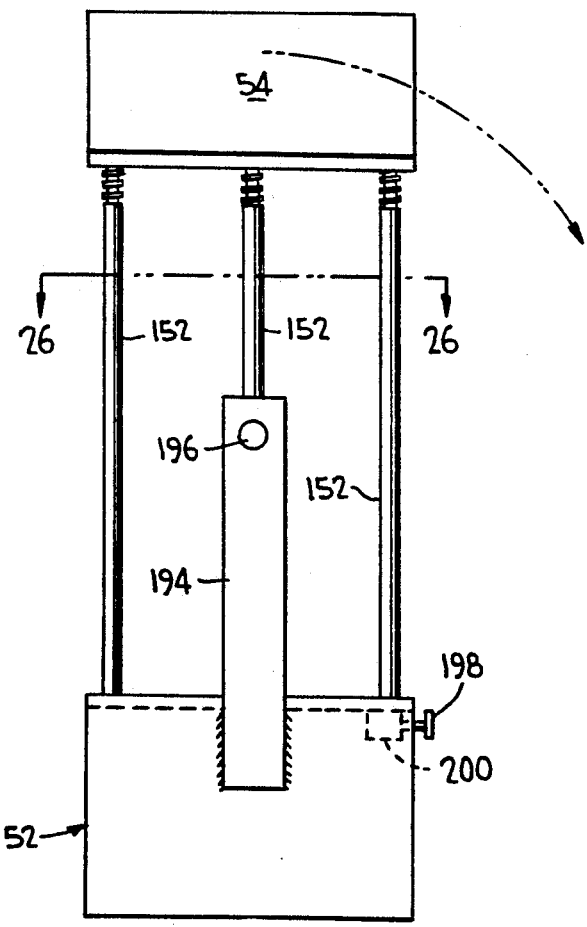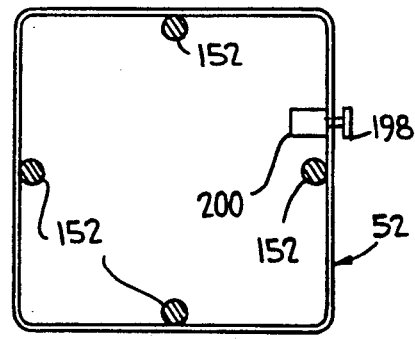

APPARATUS FOR PLACEMENT OF ANGLE PLATES IN TRANSVERSE DUCT FLANGES

FIELD OF THE INVENTION

This invention relates to the placement of angle plates into the corner defined by channel flanges at the ends of panels of a duct of a conventional type. More specifically, the invention relates to apparatus for and method of automatically placing the angle plates into the channel flanges of ducts once a duct is positioned relative to the machinery.

BACKGROUND OF THE INVENTION

It is well known to connect the ends of sheet metal ducts by providing the ducts at opposite ends of the panels of the ducts which open towards one another and wherein there is disposed at the corners of the ducts angle plates which have opposite ends thereof seated in and connect together adjacent angle flanges. The ducts are then secured together by way of fasteners which connect together the angle plates.

Attention is here directed to the patents to Heilman et al, U.S. Pat. No. 4,466,641, and La Crosse et al, U.S. Pat. No. 4,542,923, which clearly disclose ducts formed with the channel flanges into which there are forced angle plates by way of which the ducts are connected together by bolts passing through the angle plates.

To date, the angle plates are manually secured to the ducts by manually forcing the angle plates into the duct channel flanges. This is time consuming and thus costly. Further, each angle plate must be positioned individually.

SUMMARY OF THE INVENTION

In accordance with this invention, a first objective is to provide angle plates for connecting together ducts which are so configurated whereby the angle plates may be stored in a supply hopper in a manner wherein the lower-most angle plate may be moved from beneath the remaining angle plates and applied to a duct.

Next, in order that angle plates may be automatically positioned within duct channel flanges, there is provided machinery which will automatically secure a duct for the reception of one or more angle plates. When the duct securing operation is completed, an angle plate will be moved from the bottom of a stack of angle plates against a corner of the duct and above the adjacent channel flanges. Then the angle plates are pressed into the channel flanges.

Inasmuch as there is a notch defined by adjacent ends of adjacent channel flanges, it has been found that an angle plate may be best positioned for pressing into the channel flanges with a corner thereof tilted into the notch. This results in the accurate positioning of the angle plate relative to the channel flanges.

After the angle plates are fully seated in the channel flanges, side edges of the channel flanges adjacent the notch are crimped into overlying relation with respect to the angle plate to assure interlocking of the angle plate with the duct.

Another feature of the invention is that there may be provided two sets of angle plate applicating machinery so as to simultaneously install angle plates at two corners of a duct.

Also, since angle plates must be installed at opposite ends of the duct, similar machinery may be provided for automatically installing angle plates at an upper end of the duct at the same time as angle plates are installed at the bottom end of a duct. Furthermore, the machinery for installing angle plates at the upper end of a duct is automatically vertically adjustable to compensate for differences in duct lengths.

Finally, ducts come in one or two sections which must be locked together by way of longitudinal seams. These seams may be automatically locked together by a rolling action while the angle plates are being installed.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a perspective view with parts broken away showing two ducts joined together by way of angle plates installed in channel flanges of the ducts;

FIG. 2 is a fragmentary perspective view of duct having channel flanges into which a duct joining angle plate is pressed;

FIG. 3 is a plan view of a typical angle plate having stacking means;

FIG. 4 is a perspective view showing the initial positioning of an angle plate relative to a duct in accordance with this invention;

FIG. 5 is similar perspective view showing the angle plate fully pressed into position;

FIG. 6 is a schematic perspective view of a machine formed accordance with this invention;

FIG. 7 is a fragmentary horizontal sectional view showing a lower part of a duct positioned for receiving an angle plate;

FIG. 8 is a fragmentary vertical sectional view taken generally along the line 8—8 of FIG. 7 and shows specifically both the details of a positioner for holding a duct in position and presser means for pressing an angle plate into channel flanges of such duct;

FIG. 9 is a vertical sectional view taken through a supply hopper for angle plates and apparatus for moving the lowermost angle plate of a stack into position relative to a duct for positioning in the channel flanges of such duct;

FIG. 10 is an elevational view with parts broken away showing the details of a presser unit for pressing an angle plate into a duct channel flange;

FIG. 11 is a view similar to FIG. 10 showing the tilting of the angle plate to the position shown in FIG. 4;

FIG. 12 is a view similar to FIG. 10 showing the presser unit fully pressing the angle plate into the position shown in FIG. 5;

FIG. 13 is a side elevational view with parts broken away of a crimping mechanism carried by the upper half of the machine of FIG. 1;

FIG. 14 is a sectional view taken generally along the lines 14—14 of FIG. 13 and shows further the details of the crimping mechanism;

FIG. 15 is a fragmentary vertical sectional view of the upper mechanism showing the difference in construction of the angle plate feed mechanism of the upper mechanism as to the lower mechanism of FIG. 9;

FIG. 16 a fragmentary elevational view showing the crimping mechanism of the lower part of the machine;

FIG. 17 is a control schematic showing how a fluid cylinder of a latter function of the machine is controlled by a valve actuated by a prior functioning mechanism of the FIG. 18 is a schematic plan view showing the provision of two angle plate applying machines in cooperating relation for simultaneously installing angle plates to at both ends of a duct;

FIG. 19 is a schematic perspective view showing the manner in which the clamp plate installing machine may be modified to simultaneously lock a conventional seam between one two longitudinal duct halves;

FIG. 20 is a fragmentary sectional view taken along line 20—20 of FIG. 3 and shows the details of a non-nesting spacer at the corner of the angle plate of FIG. 3;

FIG. 21 is a fragmentary sectional view taken along line 21—21 of FIG. 3 and shows the details of a non-nesting spacer at an end of the angle plate of FIG. 3;

FIG. 22 is a plan view of a modified form of an angle plate;

FIG. 23 is a fragmentary sectional view taken along line 23—23 of FIG. 22 and shows the details of a non-nesting spacer at the corner of the angle plate of FIG. 22;

FIG. 24 is a fragmentary sectional view taken along line 24—24 of FIG. 22 and shows the details of a non-nesting tab struck from an end portion of the angle plate of FIG. 22;

FIG. 25 is a schematic elevational view showing the pivotal mounting of the machine for repairs; and FIG. 26 is a schematic sectional view taken along line 26—26 of FIG. 25 and further shows the details of the pivotal mounting of the machine.

DETAILED DESCRIPTION OF THE DRAWINGS

Referring to FIG. 1, there is illustrated a pair of ducts 20 which are joined together utilizing angle plates 22 which are seated at corners of the ducts 20 in channel flanges 24 at each end of each panel 26 of each duct. The ducts 20 are secured together by bolts 28 and nuts 30 passing through each pair of angle plates 22.

Prior to this invention, the angle plates 22 were installed in the ducts 20 by time consuming manual operation. This invention particularly relates to a machine which will automatically place the angle plates 22 within the channel flanges 24.

Reference is now to made to FIG. 2 wherein is illustrated a lower corner of one of the ducts 20 and shows the specific details of channel flange 24 formed at opposite ends of the duct panels 26. It is to be noted that each channel flange 24 includes a base member 32 which extends transversely outwardly from each end of each panel 26. The base member 32 terminates in a side flange 34 which extends parallel to the respective panel 26 and is selectively doubled inwardly or outwardly upon itself as at 36.

Reference is now made to FIG. 3 wherein is illustrated a typical angle plate 22 which is of a right angle outline and includes a pair of integral legs 38 joined together at right angles. Each leg 38 may be of sufficient thickness to have the required strength or may be suitably reinforced, for example by upstanding flanges 40.

At a corner 42 formed by the legs 38 there is an opening 44 for receiving the bolts 28.

In accordance with this invention, the angle plates 22 must be stackable, one upon the other, as is shown in FIG. 9 with the bottom angle plate 22 in a stack being slid out from under the remainder of the angle plates 22 in that stack. To this end, each angle plate 22 is provided with at least three upstanding projections or the equivalent thereof. The projections include reversely bent tabs 46 at remote ends of the legs 38 and remotely bent tabs 47 at opposite sides of the opening 44.

As is best shown in FIG. 2, at each corner of the duct 20 there is formed by the channel flanges 24 a square notch 48. This notch, as is shown in FIG. 4, is beneficially utilized in the seating of an angle plate 42 within a pair of adjacent channel flanges 24. It will be seen that in an initial step of pressing an angle plate 22 into the pair of channel flanges 24, the corner portion of the angle plate 22 is depressed within the notch 48 with the legs 38 being tilted upwardly and tightly engaged with the panels 26 of the duct 20. Thereafter, as is shown in FIG. 5, the angle plate 22 is then fully pressed into the channel flanges 24.

Referring to FIG. 6, it will be seen that there is illustrated a machine, generally identified by the numeral 50 automatically positioning and securing angle plates within channel flanges of ducts. Returning momentarily to FIG. 1, it will be seen that there are channel flanges 24 at each end of the duct 20. The machinery 50 includes a lower unit, generally identified by the numeral 52, and an upper unit, generally identified by the numeral 54. The lower unit is constructed to place angle plates 22 within the lower channel flanges 24 while the upper unit 54 is constructed to place angle plates 22 within the upper channel flanges 24. The lower unit 52 may be utilized either by itself or in combination with the upper unit 54. The lower unit 5 will be described in detail first.

The lower unit 52 includes a platen or base plate 56 which is provided with suitable supports to position the same at an elevation wherein equipment secured to the underside of platen 56 will clear the supporting surface. There is mounted above the platen 56 in vertically spaced relation an upstanding angle plate supply hopper 58. In this manner, a lowermost angle plate 22 may be slid out from beneath the remaining angle plates within a stack of angle plates as is generally shown in FIG. 9.

The platen 56 is of a size to have seated thereon a lower part of a typical duct 20 as is shown in FIG. 6. The duct 20 is in part positioned by way of a notched plate 60 which will be described in detail hereinafter. As is best shown in FIGS. 7 and 8, the lower unit 52 includes positioning means for positioning the lower part of the duct 20 relative to the notched plate 60. The positioning means, which are generally identified by the numeral 62, includes a positioning member 64 which is pivotally mounted on a transverse pivot pin 66 mounted below the platen 56 with the platen 56 having an elongated notch 68 therein which permits the positioning member 64 to swing upwardly from a recessed position below the top surface of the platen to the duct position shown in FIGS. 7 and 8.

The positioning member 64 includes a pinion sector 70 which is engaged by a rack 72 mounted for vertical movement on an end of a piston rod 74 of a fluid motor 76.

When the lower part of the duct 20 is moved into the position shown in FIG. 8, the channel flanges 24 are now in positions for receiving angle plates 22. This is accomplished by the mechanism shown in FIG. 9 which includes a feed member 78 which is seated for sliding movement on a spacer plate 80. It is to be noted that the lowermost plate 22 is seated on that same spacer plate so that the angle plates 22 which are fed to the duct 20 will be positioned above the duct channel flange 24.

A second fluid motor 82 is mounted by means of a support 84 beneath the platen 56 and a piston rod 86 of the fluid motor carries an arm 88 which is secured to the underside of the feed plate 78 and passes through a line of slots 90 and 92 and the platen 56 and the spacer plate 80.

It will be seen that the operating stroke of the fluid motor 82 is a reciprocating stroke. A lowermost angle plate 22 is pushed from the bottom of the stack of the angle plates 22 carried by the supply hopper 58 to the right to the dotted line position of the angle plate 22 whereat the angle plate 22 engages the adjacent corner of the duct 20 overlying the two adjacent channel flanges 24.

The angle plate 22 is now in position to be pressed into the associated channel flanges 24. This is accomplished by a presser device 94 which is best illustrated in FIGS. 7, 8, 10, 11 and 12.

The presser device 94 includes the previously described notched plate 60 which is carried for downward movement by a pair of rods 96 which extends down and through the platen 56 and are connected together at their ends by a transverse connecting bar 98 which is carried by a piston rod 100 of a fluid motor 102. The fluid motor 102 is suspended below the platen 56 from a plate 104 which, in turn, is suspended from the platen 56 by rods 106. Additionally, the fluid motor 76 is also suspended from the plate 104.

The notched plate 60 has depending from the underside thereof a pair of presser blocks 108 which are adapted to engage the legs 38 of an angle plate 22.

The plate 60 also carries in depending relation a presser member 110 which is positioned to engage the corner 42 of the angle plate 22. As is best shown in FIG. 8, the presser member 110 is carried by a rod 112. The rod 112 extends upwardly through the plate 60 and is receivably urged downwardly by a spring 116. This permits the presser member 110 to resiliently move upwardly relative to the plate 60 in a manner to be described hereinafter.

Since the presser member 110 depends below the blocks 108, it will be seen that when the presser device 94 is actuated by the fluid motor 102, the presser member 110 will first engage the corner of the angle plate 22 to tilt the angle plate 22 in the manner best shown in FIG. 4. Thereafter, as the notched plate 60 continues its downward movement, the pressure blocks 108 will engage the legs 38 of the angle plate 22 to fully force the angle plate 22 down into the channel flanges 24. This position is shown in FIG. 12 It is noted that at this time the angle plate 22 assumes a horizontal position forcing the presser member 110 upwardly against the resiliency of the spring 116.

At this time the angle plate 22 is fully seated in the two associated channel flanges 24 and may be retained in place within the channel flanges 24 by beads. However, it is preferred to crimp the side flanges 34, 36 over the legs 38 of the angle plate to retain it in place.

The crimping of the side flanges 34, 36 is effected by two separate crimping heads 118 which form parts of crimping devices 120 which extend upwardly through openings 122 in the platen 56, as is best shown in FIG. 16. Each crimping head 118 is carried by an angle lever 124 which is pivotally mounted on a pivot pin 126. The pivot pin 126 is suitably mounted below the platen 56.

The specific details of the crimping device 120 are best shown in FIGS. 13 and 14 with respect to the crimping devices carried by the top unit 54 which includes a platen 128 having an opening 122 therethrough for each of the crimping devices 120.

It will be seen that there are a pair of mounting plates 130 which are bolted to the platen 128 and which are disposed in spaced parallel relation. The mounting plates 130 are connected together in spaced relation at their free ends by way of a cam block 132 and bolts 134.

It will also be seen that the pivot pin 126 is carried by the plates 130.

It will also be seen that the crimping device 120 further includes actuating links 136 which have one end thereof connected to the angle lever 124 by a pivot pin 138. The opposite end of the links 136 carries a pivot pin 140 which has the opposite ends thereof received in a guide slot 142 formed in each of the plates 130. The first pin carries a cam follower 150 which engages a cam surface 151 of the cam block 132.

An end of a piston rod 144 of a fluid motor 146 is connected to the link 136 by a pivot pin 148. It is to be understood that the non-illustrated end of the fluid motor 146 is pivotally mounted relative to the platen 128 to allow a slight vertical movement of the piston rod 144.

When the fluid motor 146 is actuated to move the piston rod 144 to the right, as the pivot pin 140 moves to the right in guide slot 142, the engagement of the cam follower 150 with the cam surface 151 forces the lever 136 downwardly to pivot the angle lever 124 in a counterclockwise direction to effect a crimping operation such as is as shown in FIG. 16. On the return stroke of the fluid motor 146, the upper ends of the links 136 are guided by the pivot pins 148 in the guide slots.

Referring once again to FIG. 6, it will be seen that the platen 128 is mounted above the platen 56 by a plurality of rods 152 which extend through the plate 128 and terminate in threaded upper ends receiving adjustable nuts which function as stops 154. It is to be particularly noted that the upper ends of the rods 152 carry coil springs 156 which resiliently mount the platen 128 for vertical downward movement of the platen 128.

The vertical adjustment of the platen 128 is required in that the ducts 20 are not always of the same length, but may vary in length due to the width of the sheet metal strip from which they are formed. The ducts 20 are of a nominal length and the position of the platen 128 may be adjusted by way of the adjustable stops 154. The purpose of the coil springs 156 will be described in more detail hereinafter.

It is to be understood that the apparatus carried by the platen 56 is primarily duplicated on the platen 128, with two minor exceptions. Since the lower channel flange 24 of the duct 20 opens upwardly, the angle plates 22 may be moved into overlying relation with respect to the lower channel flange 24 as shown in FIG. 9 and then pressed into the channel flanges in the manner shown in FIGS. 10-12. However, because the upper channel flanges 24 open downwardly, the angle plates 22 must be applied in a different manner.

Also, as shown in FIG. 6, the plate 104 is seated on the crimping devices 120 and stabilized by rods 106.

Reference is now made to FIG. 15 wherein it will be seen that underlying the platen 128 is a shelf 156 which is suspended from the platen 128 as shown at 158. Overlying the shelf 156 is an opening 160 through the platen 128. A stack of the angle plates 22 extends down through the opening 160 and is seated on the shelf 156. A lower part of the supply hopper 58 extends through the opening 160 and terminates in spaced relation above the shelf 156.

Next, it will be seen that the notched plate 60 has a lower position generally below the shelf 156 with the presser blocks 108 and the presser member 110 thereof positioned below the top surface of the shelf 156. The feed plate 78 is seated on the shelf 156 for sliding movement so as to move a lowermost angle plate from the bottom of the stack of angle plates to the right into engagement with an adjacent corner of an associated duct with the angle plates being supported by the presser blocks 108 and the presser member 110.

The feed plate movement is controlled by the fluid motor 82 which is suspended from the shelf 156 in the same manner as that shown in FIG. 9 with the arm 88 carried by the piston rod 86 extending up through an elongated slot 162 in the shelf 156.

When the angle plate is in position engaging the corner of the ducts 20, the angle plate is now ready to be inserted into the adjacent channel flanges 24. This is caused by the upward movement of the notched plate 60 with the angle plate 22 being first tilted as shown in FIG. 4 and then firmly pressed into the channel flanges 24 as shown in FIG. 5.

Reference is now made to FIG. 7 wherein there is illustrated a position control device such as switch 164 carried by the notched plate 60. When a duct 20 is in position for receiving an angle plate 22, the duct engages the switch 164 to close the same.

Referring now to FIG. 17, it will be seen that there is illustrated a control system for automatically actuating the fluid motors 82. It will be seen that the control system includes an air supply 166 which is coupled to a control valve 168. The control valve 168 is also coupled to exhausts 170. The opposite sides of the control valve 168 is coupled to opposite ends of the fluid motor 82 which is of the double acting type. The control valve 168 may be of the solenoid actuated type including a coil 172.

The circuitry includes a power source 174 with switches 164 engaged by opposite ends of the duct 20 being connected in series.

Thus, when the duct 20 has both ends thereof in position for receiving angle plates 22, the switches 164 will be closed in that the apparatus 50 is ready to feed angle plates to the channel flanges. This provides for the automatic operation of the machine 50. It also provides a safety check in that if both ends of the duct 20 are not in position for receiving angle plates, the angle plate feed mechanism will not be actuated.

While additional switches have not been specifically illustrated, it is to be understood that switches will be provided for engagement by the angle plates when they are in the position shown in FIG. 4 to actuate the fluid motors 102 to press the angle plates into the channel flanges. There will be further control switches to be engaged by the notched plates 60 so as to energize the fluid motors 146 of the crimping devices.

Finally there will be incorporated in each circuitry a normally closed switch 176 which will be opened by the crimping devices to reset all of the mechanisms.

Returning now to the resilient mounting of the platen 128, it is to be understood that if a duct 20 is shorter than normal, the channel flanges at the upper end thereof will be spaced below the underside of the platen 128. When the machine 50 is actuated to press the angle plates 22 into the channel flanges 24, the lower pressing device 94 will clamp the associated lower channel flanges 24 against the upper surface of the platen 56. At the same time, the upper pressing mechanism 94 will force the associated angle plate 22 against the upper channel flanges 24 urging the duct 20 to move upwardly. Since the duct 20 is clamped against the lower platen 56, the net result is that temporarily the upper platen 128 will be urged downwardly against the resistance of the springs 156 until the platen 128 engages the upper channel flanges 24. Thus the spring mounting of the upper platen 128 will automatically compensate for any variation in length of the duct 20.

The machine 50, as described above, places angle plates 22 at only one corner of a duct at a time period. It is, however, contemplated that angle plates may be applied to two or more corners of the duct 20 at one time. Accordingly, reference is made to FIG. 18 wherein two of such machines 50 are illustrated as constructed to simultaneously place angle plates 22 at two corners of the duct 20 simultaneously.

It is further envisioned that the two machines 50 may be incorporated on a single set of supports.

At this time, it is pointed out that while the duct 20 may be of a one-piece construction with panels 26 thereof integrally joined at three corners and interlocked at a fourth corner, each duct 20 may be made up of two L-shaped halves. These halves may include two panels 26 with the halves joined at the remote corners of the duct by way of a seam which is commonly referred to as a Pittsburgh seam shown in FIG. 19 and identified by the numeral 178. In FIG. 19 is also illustrated a conventional seaming head 180 to effect the locking of the seam 178. The seaming head 180 is mounted for vertical movement on two rods 182 and adapted to be moved up and down along the seam 178 by suitable means.

The seaming head 180 may be formed in two parts initially positioned mid-height of the duct 20 and first move in opposite directions and then back together.

It is to be understood that the seaming means which includes the seaming head 180 may be part of the machine 50 so as to automatically effect the seaming operation while the duct halves are mounted on the machine 50 for receiving angle plates. The seaming head 180 may be actuated in advance of the application of angle plates or concurrently therewith.

Further, while it has not been specifically illustrated, conventional ducts 20 are also formed in two halves with each half including one full panel 26 and two half panels 26 with the half panels being joined together. These duct halves may be seamed together by a conventional seaming head in a like manner as described with reference to FIG. 19. More practically, seaming head 180 may occupy a right-hand position as shown in FIG. 18.

Referring once again to FIG. 3 and FIGS. 20 and 21, it will be seen that the tabs 46 are reversely formed at the ends of the legs 38 and are curved upwardly and longitudinally to prevent nesting. In a like manner, tabs 47 extending longitudinally of the angle plate are slightly curved away from each other at the tops thereof to prevent nesting.

Referring next to FIGS. 22-24, it will be seen that there is illustrated a modified form of angle plate generally identified by the reference numeral 186 which is similar to the angle plate 22 and differs therefrom only in the tabs 188 which are changed from the tabs 46. The tabs 188 are generally T-shaped and are struck from like-shaped openings 190 in the legs 38.

Although in FIG. 6 the machine 50 is shown as supported by the platen 56 of the lower unit 52, the machine may be mounted for tilting movement to facilitate repairs as shown in FIGS. 25 and 26.

The lower unit 52, which carries the upper unit 54 on rods 152, may be mounted on rods 152 by a pair of support posts 194 and horizonal pivot pins 196 for swinging from an operative vertical position of the machine 50 to a horizontal readily accessible position. A suitable releasable latch 198 is carried by the lower unit 52 and engaged with a keeper 200.

Although only a preferred embodiment of the angle plate positioning machine has been specifically illustrated and described, it is to be understood that minor modifications may be made therein without departing from the spirit and scope of the invention as defined by the dependent claims. For example, as illustrated, the corner plates are stacked and the individual plates slide off the bottom of the stack. However, it is possible to utilize other stacking means, for example an escapement mechanism to drop single corners into a sliding position. Such mechanisms are more complex and, accordingly, not preferred.

It is claimed:

1. An apparatus for automatically assembling an angle plate in channel shaped flanges at ends of duct panels joined in a corner to form a duct section with said flanges separated by a notch, said apparatus comprising a platen for engaging an end of a duct section, positioning means for locking a duct in a preselected position relative to said platen, angle plate advancing means for advancing an angle plate into engagement with a corner of a clamped duct section in axial alignment with said duct flanges, and pressing means for axially pressing an angle plate into said corners.

2. Apparatus according to claim 1 wherein actuation of said angle plate advancing means is controlled by said duct clamping means, and actuation of said means for axially pressing an angle plate being controlled by actuation of said angle plate advancing means.

3. Apparatus according to claim 2 wherein each duct flange has a free side edge, and there are means for crimping said side edges over said angle plate.

4. Apparatus according to claim 3 wherein actuation of said crimping means is effected by said means for axially pressing an angle plate into said flanges completing an angle plate pressing operation.

5. Apparatus according to claim 4 wherein there are two of said crimping means, one for each of said duct flanges.

6. Apparatus according to claim 4 wherein each of said positioning means, said angle plate advancing means, said pressing means and said crimping means is actuated by a separate fluid cylinder.

7. Apparatus according to claim 1 wherein said clamping means includes an angle stop member for engaging an exterior of a duct section adjacent said corner, and a movable finger for engaging an interior of a duct at said duct corner to clamp the duct corner against said angle stop.

8. An apparatus according to claim 1 wherein an angle plate to be assembled with duct flanges is supported by said platen for sliding movement towards a clamped duct section, and said angle plate advancing means is constructed to directly engage an angle plate supported on said platen for sliding an angle plate into contact with a clamped duct corner.

9. Apparatus according to claim 8 wherein said clamping means includes an angle stop member for engaging an exterior of a duct section adjacent said corner, and a movable finger for engaging an interior of a duct at said duct corner to position the duct corner relative to said angle stop.

10. An apparatus according to claim 1 wherein said pressing means includes a first pressing finger aligned with a duct notch for engaging a corner of an angle plate being installed to tilt such angle plate into said notch, and second fingers for engaging portions of angle plate for fully pressing a tilted angle plate into said flanges.

11. An apparatus according to claim 10 wherein said first pressing finger is resiliently mounted to permit return of a tilted angle plate from its tilted position.

12. Apparatus according to claim 1 wherein said pressing means is configurated and positioned to receive and support an angle plate when such angle plate is engaged with a duct section.

13. Apparatus according to claim 1 wherein there are two of said apparatus disposed in opposed spaced vertical relation for simultaneously applying an angle plate to duct flanges at opposite ends of a duct section.

14. Apparatus according to claim 13 wherein an upper one of said apparatus is resiliently mounted to compensate for variations in duct sections length.

15. Apparatus according to claim 13 wherein a duct is formed of at least two duct sections having crimpable seams, and there are seam crimping means for engaging duct seams when duct sections are supported by two cooperating apparatus.

16. Apparatus according to claim 13 wherein said machine is mounted for tilting about a horizontal axis between a vertical operative position and a horizontal accessible position.

17. Apparatus according to claim 1 wherein there is an angle plate supply hopper for automatically supplying angle plates to said angle plate advancing means.

* * * * *